April 28, 1964   W. A. SCUDIERI   3,130,493
MEANS FOR REMOVING END FITTINGS FROM HOSES
Filed Oct. 20, 1960
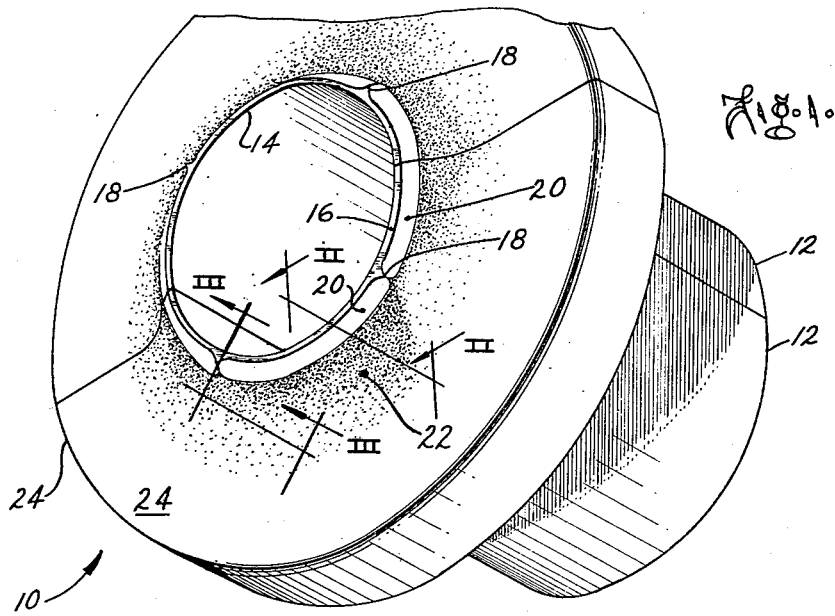
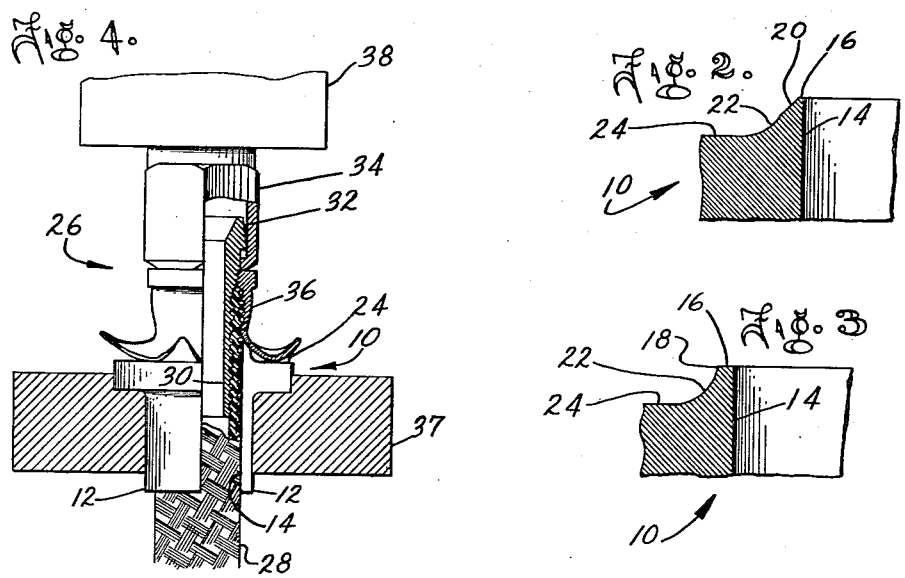
INVENTOR.
William Arthur Scudieri
BY Chapin & Neal
ATTORNEYS

United States Patent Office 3,130,493
Patented Apr. 28, 1964

3,130,493
MEANS FOR REMOVING END FITTINGS FROM HOSES
William Arthur Scudieri, Hazardville, Conn., assignor, by mesne assignments, to Atlas Corporation, Kings, N.Y., a corporation of Delaware
Filed Oct. 20, 1960, Ser. No. 63,901
3 Claims. (Cl. 30—316)

The present invention relates to improvements in removing "permanently attached" end fittings from flexible hose or the like.

End fittings, as herein contemplated, for high performance flexible hose comprise a metal socket which is deformed to grip the end of a length of hose and permanently attach the fitting thereto. This is opposed to reuseable end fittings which are not deformed and may be removed and reattached to hose several times. The permanently attached fittings possess superior operational features which outweigh the fact that they cannot be reused.

One widely accepted end fitting design, of the permanently attached type, comprises a main portion integral with an insert which is telescoped into the end of a hose. A sleeve threaded onto the insert forms a socket in which the hose end is received. The sleeve is reduced in diameter (by swaging or crimping) to grip the end of the hose against the insert. It has been found that if the sleeve is removed without disturbing the insert, then the main portion of the fitting may be reused simply by providing a new sleeve. The sleeve is a relatively inexpensive item and is standard for many different end fittings which vary greatly and are often quite expensive insofar as the main portion is concerned.

The object of the invention is to provide means for simply and quickly removing the sleeves from permanently attached end fittings without injuring the main portion thereof whereby the main portion may be reused simply by providing a new sleeve.

The present inventive concepts are characterized by the use of a tapered collar which wedges between the end fitting sleeve and the hose to which it is attached. The tapered collar is forced toward the base of the socket receiving the hose thereby rupturing the sleeve of the fitting. Preferably the tapered collar is provided with nibs which split the end fitting sleeve so that it will be peeled back after the fashion in which a banana skin is removed. After the end fitting sleeve is peeled back, the tapered collar is removed and the end fitting disengaged from the hose. The sleeve can then be removed and the main portion of the end fitting may then be reused simply by providing a new sleeve.

The above and other related objects and features of the invention will be apparent from a reading of the following description of the disclosure found in the accompanying drawing and the novelty thereof pointed out in the accompanying claims.

In the drawing:

FIG. 1 is a perspective view, partly in section, of a tapered collar for removing sleeves of permanently attached end fittings;

FIG. 2 is a section taken on line II—II in FIG. 1;

FIG. 3 is a section taken on line III—III in FIG. 1; and

FIG. 4 is a view, on a reduced scale and partly in longitudinal section, showing the tapered collar of FIG. 1 in use.

FIG. 1, shows, in perspective, a tapered collar 10 embodying the present invention. This collar comprises two longitudinally separable portions 12 which compositely form a bore 14. The bore 14 has a diameter substantially matching that of the hose from which an end fitting is to be removed.

The outer end of the tapered portion of the collar 10 is actually formed as a narrow radial face 16 (FIGS. 2 and 3) which projects outwardly at four points to form nibs 18 (FIGS. 1 and 3). Intermediate these nibs are tapered surfaces 20 (FIGS. 1 and 2). Both the nibs 18 and surfaces 20 blend by way of a curved surface 22 with a flange 24.

The manner of using the tapered collar 10 is best appreciated by now referring to FIG. 4 which shows an end fitting 26 in the process of being removed from a hose 28. The end fitting 26 comprises an insert portion 30 which is integrally formed with the body portion 32 of the fitting. The fitting 26 is the female portion of a coupling as will be evident from the seat formed on the body portion 32 and the nut 34. The body portion could, of course, take many varied forms depending on the end use of the fitting. A sleeve 36 is threaded onto the body portion 32 and forms, in combination with the insert portion 30, a socket in which is received the end portion of hose 28.

The collar 10 is placed around the hose 28 and then the hose and end fitting assembly, along with the collar 10, are preferably mounted in a press or like pressure assist device. The press may comprise a fixed bed 37 which has an opening for receiving the collar 10 and a ram 38. Power means such as a hydraulic pump may be employed to force the ram against the outer end of the fitting and thereby drive the tapered collar 10 along the length of the end fitting sleeve 36. This operation is partially completed in FIG. 4. The tapered collar 10 thus splits the sleeve 36. The preferred use of the nibs 18 causes the sleeve 36 to be split in four sections along definite lines defined by these nibs. As these sections are split, that is, as the collar 10 is moved along the length of the sleeve 36, the free end portions of the sleeve engage the flange 24 and are flared outwardly. The net result is that the sleeve 36 is peeled back in much the same fashion as a banana skin would be removed.

Once the sleeve is peeled back to the base of the socket, the hose assembly will be removed from the power press and the collar 10 removed from the hose. It is now possible to remove the hose 28 from the fitting 26. Having done this, the sleeve 36 may be unthreaded from the body portion 34.

The body portion 34 has in no way been affected or altered during the removal of the sleeve 36 and thus is in suitable condition for reuse simply by providing a new sleeve 36 which may be threaded onto the body portion 34 to form a socket for a new hose end. The new sleeve 36 may then be compressed to confine the hose end against the insert portion 32.

It will, of course, be apparent that the described means of removing the sleeve 36 requires nothing in the way of special tooling beyond a power press which would be found in even the simplest of machine shops and even this is not necessary as a simple fixture could be provided and manual pressure or hammer blows used to split the sleeve 36 so that it may be removed.

Having salvaged the body portion of the fitting, it will also be obvious that only a very simple and inexpensive replacement sleeve will be required to render the main portion of the fitting reuseable. This will result in a substantial saving not only on replacement parts, but in the supply inventory of end fitting parts which must be maintained in military installations or the like.

Having thus described the invention, what is believed to be novel and desired to be protected by Letters Patent of the United States is:

1. Means for removing permanently attached end fittings from hoses or the like wherein the end fitting comprises an insert portion telescoped into the hose and a sleeve removably secured to the insert portion and forming therewith a socket for receiving the hose end, said sleeve being reduced in diameter and clamping the hose end against the insert, said removing means comprising a longitudinally separable collar having an opening therethrough which is adapted to embrace the hose, said collar having a circumferentially extending radial flange and a tapered portion at one end inclined outwardly from said opening and blending with said flange and adapted to wedge between said sleeve and hose, said tapered portion having a pair of diametrically opposed nibs adjacent said opening projecting radially outwardly whereby the end fitting sleeve can be split along definite lines established by the nibs as the tapered portion of the collar is forced thereagainst.

2. Means for removing permanently attached end fittings from hoses or the like wherein the end fitting comprises an insert portion telescoped into the hose and a sleeve removably secured to the insert portion and forming therewith a socket for receiving the hose end, said sleeve being reduced in diameter and clamping the hose end against the insert, said removing means comprising a longitudinally separable collar having an opening therethrough which is adapted to embrace the hose, said collar having a circumferentially extending radial flange and a relatively short tapered portion inclined outwardly from said opening and blending with said flange, said tapered portion being adapted to wedge between said sleeve and hose for removal of the sleeve, said tapered portion further having a plurality of nibs, at least four in number, angularly spaced about the tapered portion thereof adjacent said opening and projecting radially outwardly whereby the end fitting sleeve can be split along definite lines established by the nibs as the tapered collar is forced thereagainst.

3. Means for removing permanently attached end fittings from hoses or the like wherein the end fitting comprises an insert portion telescoped into the hose and a sleeve removably secured to the insert portion and forming therewith a socket for receiving the hose end, said sleeve being reduced in diameter and clamping the hose end against the insert, said removing means comprising a longitudinally separable collar having an opening therethrough which is adapted to embrace the hose, said collar having a circumferentially extending radial flange and a tapered portion at one end inclined outwardly from said opening and blending with said flange and adapted to wedge between said sleeve and hose, said tapered portion having at least one nib adjacent said opening projecting radially outwardly whereby the end fitting sleeve can be split along a definite line established by a nib as the tapered portion of the collar is forced thereagainst.

References Cited in the file of this patent
UNITED STATES PATENTS

| | | |
|---|---|---|
| 245,055 | Callahan | Aug. 2, 1881 |
| 349,071 | Watson | Sept. 14, 1886 |
| 2,046,341 | McParlin | July 7, 1936 |
| 2,376,858 | Barrans et al. | May 29, 1945 |
| 2,627,768 | Cook | Feb. 10, 1953 |
| 2,688,185 | Brazil et al. | Sept. 7, 1954 |
| 2,731,714 | Dudley | Jan. 24, 1956 |
| 2,874,457 | Bennett | Feb. 24, 1959 |
| 3,000,097 | Hartz | Sept. 19, 1961 |
| 3,044,333 | Broske | July 17, 1962 |
| 3,067,802 | Jerome | Dec. 11, 1962 |